(12) United States Patent
Franz et al.

(10) Patent No.: US 9,784,256 B2
(45) Date of Patent: Oct. 10, 2017

(54) HYDROSTATIC ACTUATOR AND ARRANGEMENT OF A HYDROSTATIC ACTUATOR IN A MOTOR VEHICLE

(71) Applicants: Viktor Franz, Karlsruhe (DE); Matthias Ehrlich, Buehl (DE); Norbert Esly, Buehl (DE); Matthias Gramann, Renchen (DE); Juergen Gerhart, Appenweier (DE); Julian Botiov, Buehl (DE)

(72) Inventors: Viktor Franz, Karlsruhe (DE); Matthias Ehrlich, Buehl (DE); Norbert Esly, Buehl (DE); Matthias Gramann, Renchen (DE); Juergen Gerhart, Appenweier (DE); Julian Botiov, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 850 days.

(21) Appl. No.: 13/650,032

(22) Filed: Oct. 11, 2012

(65) Prior Publication Data

US 2014/0105768 A1    Apr. 17, 2014

Related U.S. Application Data

(63) Continuation of application No. PCT/DE2011/000321, filed on Mar. 24, 2011.

(30) Foreign Application Priority Data

Apr. 12, 2010   (DE) .................. 10 2010 014 673

(51) Int. Cl.
*F04B 9/02*     (2006.01)
*H02K 7/06*     (2006.01)
(Continued)

(52) U.S. Cl.
CPC .............. *F04B 9/02* (2013.01); *F03C 1/0605* (2013.01); *F03C 1/0607* (2013.01); *F04B 9/047* (2013.01);
(Continued)

(58) Field of Classification Search
CPC .. F16H 25/2252; F16H 25/088; F16D 29/005; F16D 2025/081; F16D 2048/0251;
(Continued)

(56) References Cited

U.S. PATENT DOCUMENTS 5,000,523 A * 3/1991 Mikhaeil-Boules .. B60T 8/4266
303/115.2
5,313,852 A * 5/1994 Arena ................. F16H 25/2018
74/89.13

(Continued)

FOREIGN PATENT DOCUMENTS

DE        20380247 U1    2/2005
DE    102006014866 A1   10/2006
(Continued)

OTHER PUBLICATIONS

International Search Report for parent application PCT/DE2011/000321.
(Continued)

*Primary Examiner* — Nathan Zollinger
(74) *Attorney, Agent, or Firm* — Davidson, Davidson & Kappel, LLC

(57) ABSTRACT

A hydrostatic actuator and an arrangement for attaching it to a receiving component are provided. The hydrostatic actuator has a master cylinder containing a housing and a piston movable axially within the housing which acts on a pressure chamber filled with a pressurizing agent. The piston is driven by a rotary-driven electric motor having a stator and a rotor, by a rolling planetary transmission that converts the (Continued)

rotary drive to an axial motion. In order to be able to produce such a hydrostatic actuator with little need for construction space, cost-effectively and with better quality, a supporting of the rolling planetary transmission is simplified, and the cooling and shielding of an electronic controller and the pressure behavior of the hydrostatic actuator is improved.

19 Claims, 4 Drawing Sheets

(51) Int. Cl.

| | | |
|---|---|---|
| *F04B 9/04* | (2006.01) | |
| *F03C 1/28* | (2006.01) | |
| *F03C 1/06* | (2006.01) | |
| F16D 125/40 | (2012.01) | |
| F16H 25/22 | (2006.01) | |

(52) U.S. Cl.
 CPC ...... *F16D 2125/40* (2013.01); *F16H 25/2252* (2013.01); *H02K 7/06* (2013.01)

(58) Field of Classification Search
 CPC ...... F16D 2125/40; F16D 25/088; F15B 7/08; H02K 7/06; B60T 13/745; F04B 9/02; F04B 9/047; F04B 17/03; F04B 49/00; F03C 1/0605; F03C 1/0607
 USPC ......... 417/416, 417, 360; 310/12.31, 90, 91, 310/80, 12.14, 12.19, 20, 15; 60/534, 60/545; 475/2, 5, 116, 149
 See application file for complete search history.

(56) References Cited

U.S. PATENT DOCUMENTS

| | | | | |
|---|---|---|---|---|
| 5,533,336 | A * | 7/1996 | Kiat | B30B 15/0052 100/270 |
| 6,230,492 | B1 * | 5/2001 | Kingston | B60T 13/745 60/545 |
| 6,767,305 | B2 * | 7/2004 | Backes | F16D 65/18 188/161 |
| 7,449,139 | B2 * | 11/2008 | Kestle | B29C 45/68 164/137 |
| 8,490,391 | B2 * | 7/2013 | Franz | F16D 29/005 60/534 |
| 2006/0228236 | A1 * | 10/2006 | Krisher | F16D 29/005 417/415 |
| 2006/0245954 | A1 * | 11/2006 | Wiechmann | F04B 9/02 417/415 |
| 2007/0135258 | A1 | 6/2007 | Reisch et al. | |
| 2012/0217117 | A1 * | 8/2012 | Gramann | F16D 29/005 192/83 |
| 2012/0241281 | A1 * | 9/2012 | Franz | F16D 29/005 192/84.6 |

FOREIGN PATENT DOCUMENTS

| | | |
|---|---|---|
| DE | 102005058776 A1 | 7/2007 |
| EP | 1249627 A1 | 10/2002 |
| EP | 1712789 A2 | 10/2006 |
| JP | 2000038993 A | 2/2000 |
| JP | 2007064314 A | 5/2000 |
| JP | 2001327116 A | 11/2001 |
| JP | 2002079838 A | 3/2002 |
| JP | 2003032988 A | 1/2003 |
| JP | 2003307203 A | 10/2003 |
| JP | 2004175355 A | 5/2006 |
| JP | 2009060760 A | 3/2009 |
| JP | 2009131032 A | 6/2009 |
| WO | WO 2011/050766 A1 | 5/2011 |
| WO | WO 2011/050767 A1 | 5/2011 |

OTHER PUBLICATIONS

International Preliminary Report on Patentability for parent application PCT/DE2011/000321.

* cited by examiner

HYDROSTATIC ACTUATOR AND ARRANGEMENT OF A HYDROSTATIC ACTUATOR IN A MOTOR VEHICLE

This is a continuation of prior International Application PCT/DE2011/000321, filed Mar. 24, 2011, which claims priority to German Patent Application DE 10 2010 014 673.0, filed Apr. 12, 2010, the entire disclosures of which are hereby incorporated by reference herein.

The invention relates to a hydrostatic actuator and to an arrangement for attaching it to a receiving component having a master cylinder containing a housing and a piston movable axially within the housing which acts on a pressure chamber filled with a pressurizing agent, which is driven by a rotary-driven electric motor having a stator and a rotor, by a rolling planetary transmission that converts the rotary drive to an axial motion.

BACKGROUND

Hydrostatic actuators of this species are employed in particular in motor vehicles, and for example for operating brakes such as service brakes and/or parking brakes, parking locks, transmission elements for actuating shifting devices in transmissions such as for example double-clutch transmissions and/or preferentially for actuating one or in the case of a double-clutch transmission two friction clutches, and are known for example from the unpublished German patent applications No. 10 2009 051 245.4 and No. 10 2010 009 297.5. In such hydrostatic actuators, a spindle of the rolling planetary transmission is driven by an electric motor. By means of the planetary body and the ring gear of the rolling planetary transmission, the rotary motion is converted to an axial motion, and a piston of a master cylinder is driven, which acts on the pressurizing agent of a pressure chamber, which transmits the built-up pressure through a pressure line to a pressure chamber of a slave cylinder that is filled with pressurizing medium, whereby a working piston of the slave cylinder is moved axially, which in turn carries out a corresponding actuating work on a brake, friction clutch or the like. For example, by the axial movement of the working piston a brake may be activated or released, or a friction clutch may be engaged or disengaged.

SUMMARY OF THE INVENTION

The object of the invention is to refine such a hydrostatic actuator, in particular within the scope of cost-effective production, improving and/or simplifying its function and manageability. In particular, an effort will be made to reduce and simplify the arrangement and supporting of the drive components in the housing, to improve the function of an electronic control device supplying the electric motor, and/or to improve assembly in terms of a simplified attachment of the hydrostatic actuator to a receiving component. An additional object is the improved positioning of a hydrostatic actuator on a receiving component.

At least part of the object is fulfilled by a hydrostatic actuator having a master cylinder, in particular in a motor vehicle, containing a housing and a piston that is axially movable in the housing, which acts on a pressure chamber filled with a pressurizing agent, which is driven by a rotary-driven electric motor having a stator and a rotor, by a rolling planetary transmission that converts the rotary drive to an axial motion, the rolling planetary transmission being centered in the housing and a spindle driven by the electric motor being supported with respect to the housing by a single radial bearing. Because the rolling planetary transmission is guided radially in the housing, it is possible to save one radial bearing; for example, making it possible that the spindle of the rolling planetary transmission now only has to be supported on one side, preferably on its end facing the electric motor.

Alternatively or in addition, the hydrostatic actuator may be provided with an integrated electronic control device to supply the electric motor. This device is situated, for example, on the side of the electric motor facing away from the master cylinder, on an attaching device of the hydrostatic actuator on a component of the motor vehicle. To form a heat sink from the electronic control device to the attaching device and from there into a normally cooler receiving component of the motor vehicle, for example a housing wall of a transmission, a clutch bell, a vehicle chassis or the like, and thus to create effective cooling of the electronic control device, which is provided for example with power electronics, a heat dissipation device is provided between the electronic control device and the attaching device. This can be formed for example by improved conductivity of a housing component, a heat conducting plate. It has proven to be advantageous for the electronic control device to be situated on one or more circuit boards spaced at axial intervals perpendicular in cross section to the axis of rotation of the rotor of the electric motor, at a distance from the latter, so that sensor components can be situated directly on the plate, and the attaching device situated on the circumference of the housing and adjoining the housing directly on the face of the latter is situated quasi directly outside of the electronic control device. In this way, a very short path for dissipating the heat which develops in particular in the power electronics into the attaching device, and from there into the receiving component, can be achieved. It is therefore also advantageous if the layout of the circuit boards of the electronic control device is designed so that the heat-producing elements of the power electronics, such as power transistors, are facing the part of the housing that receive or form the attaching device.

According to the inventive idea, it is also possible, alternatively or in addition to the proposed improvements, to provide in the electronic control device for supplying the electric motor, integrated into the hydrostatic actuator, a rotation angle sensor with a sensing magnet for a spindle of the rolling planetary transmission, it being possible to calibrate an axial position of the sensing magnet with respect to the spindle. Because of the arrangement of the electronic control device axially adjacent to the face of the electric motor with the rotor that drives the spindle, a rotary angle sensor can be situated directly on the circuit board and thus without additional conductors. The sensor detects the changing magnetic field of one or more sensing magnets that rotate with the spindle. To ensure replicable signal detection, with additive tolerances between the circuit board of the electronic control device that receives the rotational angle sensor and the sensing magnets assigned to the spindle, these magnets can be advantageously calibrated in their axial guide. It is provided here that the sensing magnets should be calibrated against a calibration point that is fixed relative to the electronic control device, for example a housing flange, while the electronic control device is still removed, since direct calibration against the rotational angle sensor is difficult or impossible, in particular because of accessibility when the electronic control device is already installed.

According to another perspective of an improved hydrostatic actuator according to the invention, the electronic control device may be protected to a special degree against electromagnetic interference. For example, by a shielding plate it is possible to suppress electromagnetic feed-through in particular from the electric motor to parts of a system of control electronics provided in addition to the power electronics on the electronic control device with evaluation circuits for detected sensor signals. To this end, it has proven advantageous to arrange the shielding plate at least partially like a cup around the stator of the electric motor, to form it using appropriate electromagnetically insulating material, and to ground it accordingly.

Separately and/or as a functional unit with the shielding plate, an end shield may be arranged around the stator of the electric motor, on which shield the spindle of the rolling planetary transmission is rotatably supported. To this end, a radial bearing may be received on the end shield that encloses the stator like a cup, and the spindle may be supported in the radial bearing. It has proven to be especially advantageous if a radial heat transfer coefficient of the end shield is matched to a radial heat transfer coefficient of the components of the electric motor. In this way the air gap between rotor and stator can be kept constant to a particular degree. The heat transfer coefficient of the end shield that is suitable for this can be attained by proper selection of the material for the end plate and/or by its engineering design. For example, between the bearing receptacle of the radial bearing and the circumference of the end shield that receives the stator, the material, such as sheet metal, of the end shield may be folded axially and/or it may vary in thickness, so that as the temperature increases the end shield "grows" as it were along with the stator and rotor. In this case an appropriate, temperature-dependent radial play is provided between the housing and the end shield. In order to protect the stator, which is not rotationally fixed in the housing, from twisting, a torque support is provided in the stator, or preferably in the end shield. To this end, the stator is rotationally fixed with respect to the end shield, and the end shield has a torque support with respect to a housing component that is connected to the housing. The torque support may be provided by one or more pegs or pins distributed over the circumference, which are made of metal or plastic and each engage axially aligned openings of the end shield and a housing component. For example, such pegs may be inserted into the end shield, in which case the torque support is produced when a housing cover with the aligned opening is placed on the housing. As this is done, the opening is positioned on the peg by the angle-selective installation of the housing cover on the housing.

According to another inventive idea, the attaching device for joining the hydrostatic actuator to a receiving component may be oriented in the same direction as a pressure connection of the pressure chamber. For example, the pressure connection, for example a connector plug or a bushing of a quick coupler and screws of the attaching device on the circumferential surface of the housing may be formed in a common preferred direction, enabling a particularly simple installation of the hydrostatic actuator on the receiving component by simply placing the pressure connection on a complementarily designed mating part to produce the connection of the pressure chamber with a pressure line and tightening the screws. In this case the mating part with the pressure line may be integrated into the receiving component, or may be attached to the latter. Because of the direct and simple design of the connection of the pressure line to the hydrostatic actuator, the latter can be connected to the slave cylinder by the shortest path, therefore minimizing temperature influence on the pressure line under varying temperatures.

In particular under the influence of the temperature, and in the event of leakage in the hydraulic circuit of the pressure chamber via the pressure line to the slave cylinder, a surplus or reserve volume of pressurizing agent may become necessary in the hydraulic circuit. To this end, according to the inventive idea, a pressure equalization of the pressure chamber is provided, divided into an equalization chamber in the housing and a storage container connected thereto and situated outside of the housing. In this way, a relatively small, immediately available equalization volume, which does not influence the construction space significantly, can be kept available in the hydrostatic actuator. A greater reserve volume can be kept available at a separate, preferably construction-space-neutral location in a motor vehicle in the separately formed storage container, which is connected to the equalization chamber by a connecting line, so that the hydrostatic actuator can be designed very compactly in terms of its construction space requirement.

The object is further fulfilled by an arrangement of a hydrostatic actuator on a receiving component of a motor vehicle, having a slave cylinder supplied by the hydrostatic actuator by a pressure line and a mechanical attaching device between the hydrostatic actuator and receiving component; the attaching device being formed of a quick coupling between the pressure line and the hydrostatic actuator and at least one screw forming a positive mechanical lock between hydrostatic actuator and receiving component, and the hydrostatic actuator being connected to the receiving component mechanically and hydrostatically in the same direction in one working operation. It goes without saying that the proposed hydrostatic actuator may contain all or only individual ones of the features additionally disclosed in the description.

BRIEF DESCRIPTION OF THE DRAWINGS

The invention will be explained in further detail on the basis of the exemplary embodiment depicted in FIGS. 1 through 4. The figures show the following.

DETAILED DESCRIPTION OF THE DRAWINGS

Figure 1:
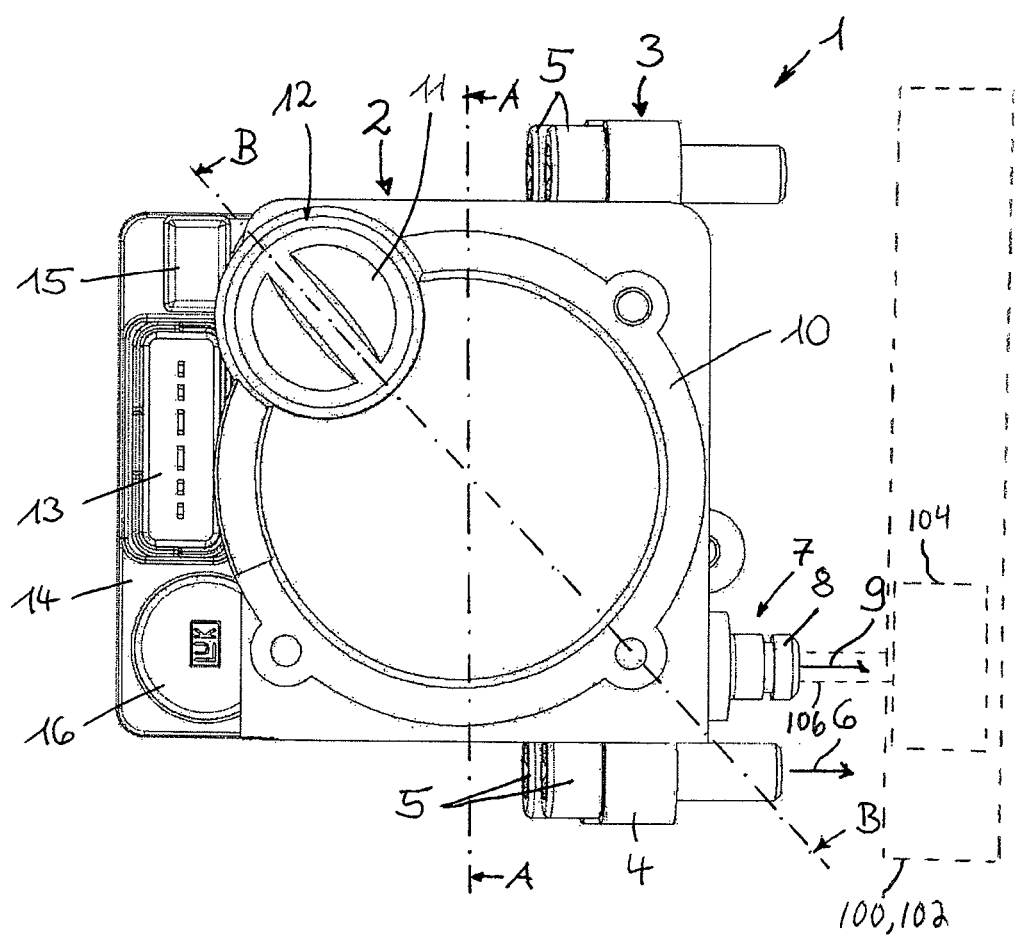
FIG. 1 shows a view of the hydrostatic actuator from above.

FIG. 1 shows a hydrostatic actuator 1 in a view from above, with a multi-part housing 2 and an attaching device 3 situated on the circumference of housing 2. The attaching device 3 is made up of an attaching flange 4, which receives screws 5, which are screwed in the joining direction along an arrow 6 into a receiving component 100 of a motor vehicle 102. Also projecting from housing 2 is a pressure connector 7—designed here as a connector plug 8—of the pressure chamber of the master cylinder in the direction of an arrow 9. The directions of arrows 6, 9 are parallel to each other, so that the hydrostatic actuator can be connected by a motion in the direction of arrows 6, 9 both mechanically and hydrostatically to the receiving component. To this end, the latter is provided with corresponding threaded openings for mechanical connection and a bushing for hydrostatic connection of hydrostatic actuator 1 to the receiving component. Connector plug 8 and the bushing in this case are preferably components of a quick coupling which automatically engages with the receiving component 100 during the installation of hydrostatic actuator 1, using force in the direction of arrow 9. The bushing is connected directly to a slave cylinder 104 of a friction clutch or a brake. A pressure line 106, preferably short, may be provided between the bushing and slave cylinder 104. In the case of actuation of a slave cylinder for a friction clutch, the hydrostatic actuator is preferably received on the bell housing as a receiving component.

In addition, the view of the hydrostatic actuator in FIG. 1 allows a view of a housing part 10 of housing 2, which covers the area of the master cylinder and contains an access opening 12 for installing and servicing the distance sensor device, which is closed by a cover 11. A connector plug 13, for supplying electricity to the electric motor of hydrostatic actuator 1, is integrated into a housing part 14, which contains an electronic control device. Projecting from housing part 14 are a connector plug 13, a flanking sensor housing 15 of a distance sensor device, and an encapsulated electronic component 16 of the electronic control device, for example a condenser.

Figure 2:
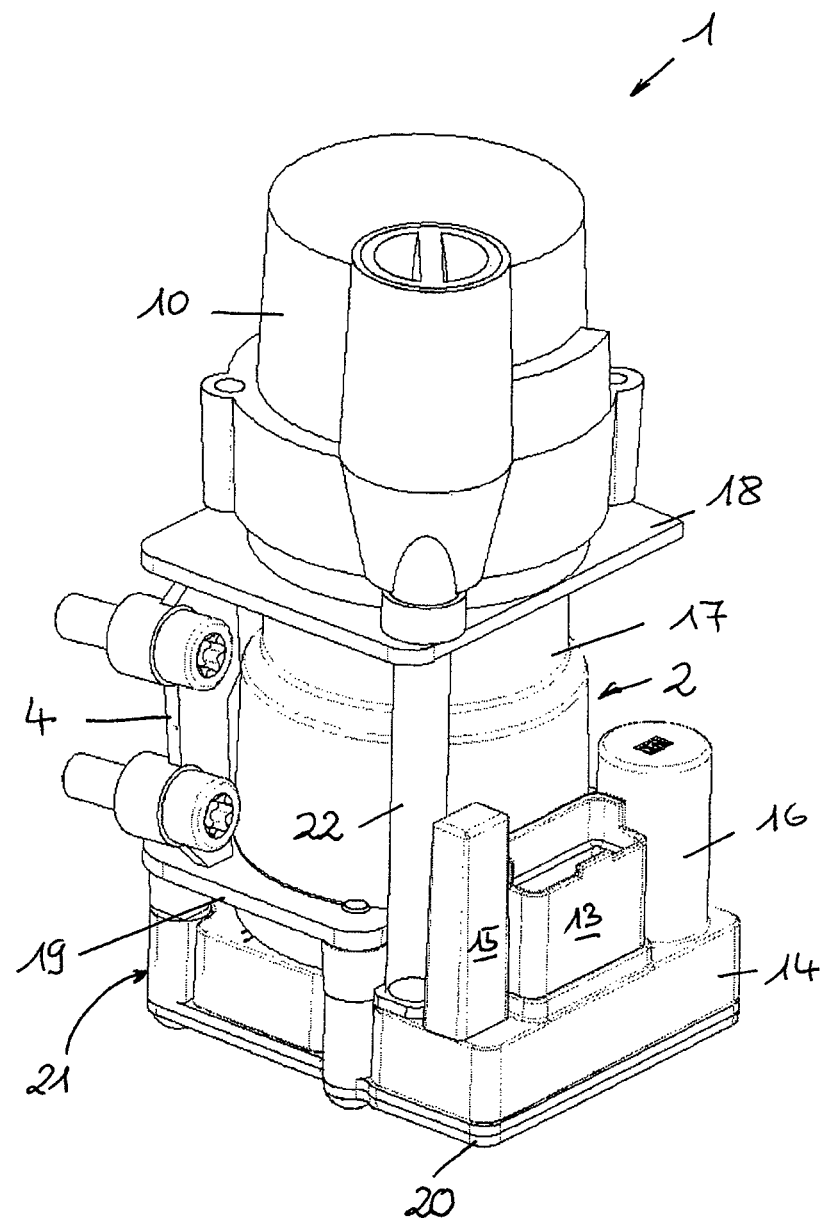
FIG. 2 shows an oblique view of the hydrostatic actuator of FIG. 1, depicted in three dimensions.

FIG. 2 shows a 3D oblique view of the hydrostatic actuator 1 from FIG. 1, with housing 2 formed from housing parts 10, 14, 17. Housing part 10 is made in cup form, for example from die cast light metal, plastic or the like, and is placed on housing part 17, and is connected to a flange 18 of the latter, for example by threaded connection. Housing part 17 receives the electric motor and the rolling planetary transmission, and is preferably made of die cast light metal. Connected to a flange 19 of housing part 17 is housing part 14, which receives the electronic control device. Housing part 14 is closed on the front by a cover 20.

The electronic control device includes, among other things, a power electronics unit for electrifying and commutating the electric motor, and produces heat from its switching and components. The heat-producing electronic components are coupled with housing part 14, which is made of heat-conductive material such as die cast light metal, forming a heat dissipation device 21, for example by heat-conductive paste or the like. The heat which arises is conducted over a short path via housing part 14 and flange 19 to attaching flange 4, which is in contact with the cooler receiving component for receiving hydrostatic actuator 1, so that a heat sink is formed, which dissipates the surplus heat, in particular from the power electronics.

Outside of housing 2, in addition to sensor housing 15, connector plug 13 and electronic component 16, a sensor channel 22 of the distance sensor device is provided, in which the sensor body moves with the movement of the master cylinder, in which case the movement of the sensor body, and thus the travel of the piston, is detected by the sensor element contained in sensor housing 15.

Figure 3:
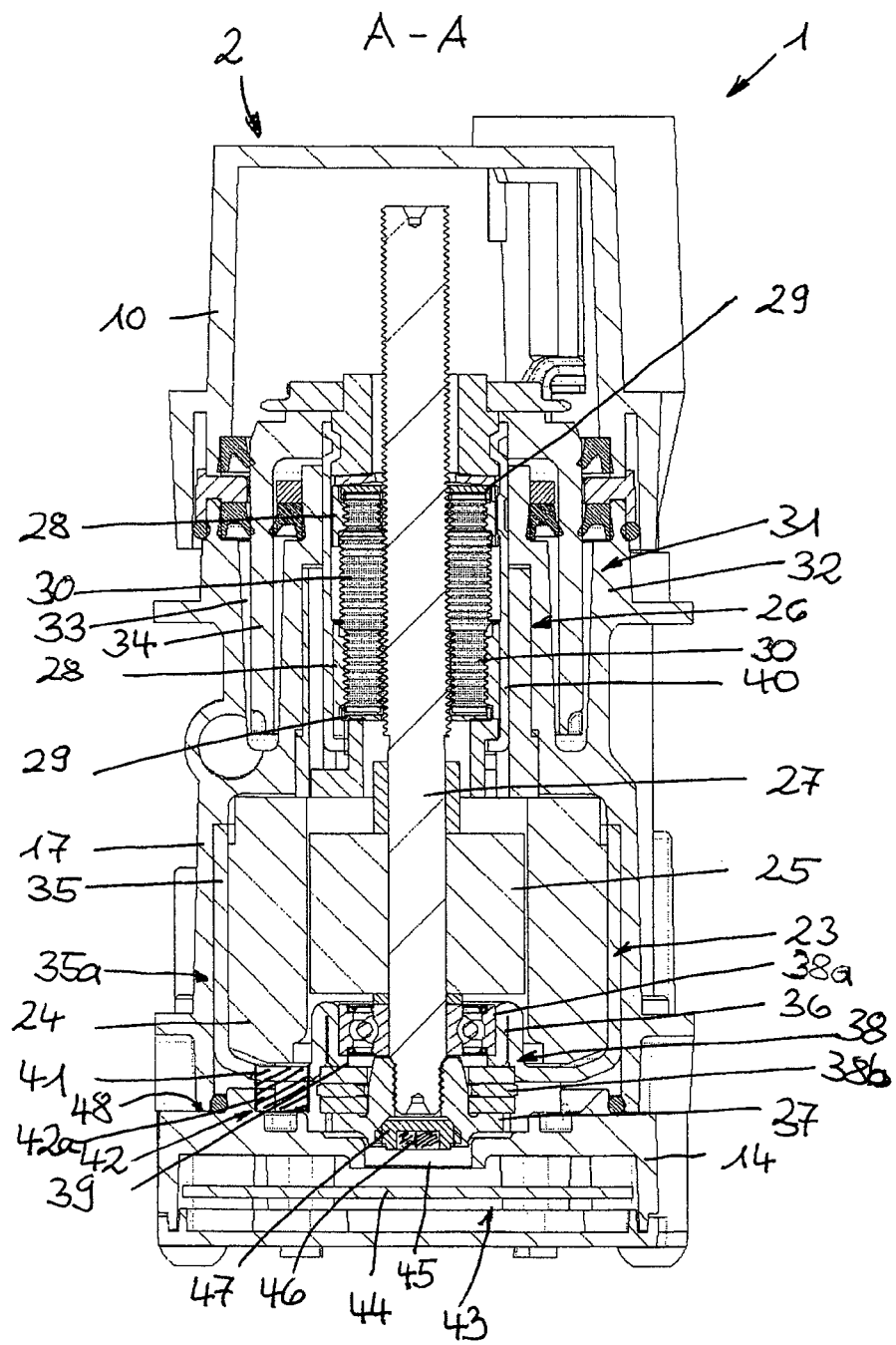
FIG. 3 shows a cross section through the hydrostatic actuator of FIG. 1 along the cutting line A-A.

FIG. 3 shows a cross section through hydrostatic actuator 1 along the cutting line A-A of FIG. 1. Accommodated in housing 2, formed from housing parts 10, 14,17, is an electric motor 23 with a stator 24 and a rotor 25, which is rotatable relative to the latter, a rolling planetary transmission 26 with a spindle 27 rotary-driven by rotor 25, ring gear sections rotary-driven by rotor 25, ring gear sections 28 and the rolling planetary bodies 30 rolling between the latter and distributed over the circumference on web parts 29, and a master cylinder 31 with a master cylinder housing 32 formed of housing part 17, and a piston 34, which is movable axially relative to the latter and with it forms a pressure chamber 33. As depicted by FIG. 3, the rolling planetary bodies 30 and ring gear sections 28 are supported by the spindle 27 between a first axial end and a front end/second axial end of the spindle such that the spindle 27 extends entirely through the rolling planetary bodies 30, the ring gear sections 28 and the piston 34, with the piston 34 being able to move axially with respect to the spindle 27.

Stator 24 of electric motor 23, for example in the form of stator segments distributed over the circumference, is received in a cup-shaped end shield 35, which is accommodated in housing part 17 and has on its floor a multiple-folded axial extension 36 to receive a support 38 of spindle 27 with a radial bearing 38a. Partly as a result of the folding of the floor, the coefficient of heat expansion of an end shield 35 corresponds substantially to the coefficient of expansion of the motor components of electric motor 23 in the radial direction, such as stator 24 and rotor 25, so that the air gap between rotor 25 and stator 24 remains essentially constant with changing temperatures. No force fit is provided between end shield 35 and housing part 17 to compensate for heat expansion. For a torque support 42 of stator 24 with respect to housing 2, end shield housing 2, end shield 35 is provided with at least one opening 41, in which in each case a pin 42a that engages housing part 14 in a rotationally fixed manner is received. In addition, end shield 35 is provided as a shielding 35a against electromagnetic feed-through into electric motor 23 or from the latter into the electronic control device. As shown by FIG. 3, the rotor 25 is situated within the stator 24 and the spindle 27 is connected to the rotor 25 towards the spindle's first axial end.

The axial force of rolling planetary transmission 26 while under pressure from piston 34 is introduced into a rim 39 of end shield 35 through a pressure disk 37, situated on spindle 27, by a thrust bearing 38b. As a result of the centering of the ring gear sections 28 on a sliding sleeve 40, it is possible to dispense with a second supporting of spindle 27 at its front end/second axial end, allowing the front end/second axial end to be a free end which extends away from the pressure chamber 33 as shown in FIG. 3 and which permits, the corresponding bearing parts, such as a rotational bearing and the isolation of a bearing dome for example in housing part 10 to be eliminated. Alternatively to the supporting 38 by radial bearing 38a and thrust bearing 38b, a four point bearing may be provided to support forces acting radially and axially. In an especially advantageous manner, such a four point bearing may be provided on spindle 27 between rolling planetary transmission 26 and electric motor 23, which saves on construction space.

An electronic control device 43 is accommodated on a circuit board 44, situated in housing part 14. The discrete electronic components are not depicted, for reasons of general overview. Situated on circuit board 44 is a rotational angle sensor 45, which monitors the rotational speed or the rotational angle of spindle 27. Rotational angle sensor 45 simultaneously detects the rotational angle of rotor 25, which is connected to spindle 27 in a rotationally fixed connection, so that rotor 25 can serve on the one hand for electronic commutation of electric motor 23, and on the other hand for redundant detection of travel of piston 34, by taking into account the gear ratio change of the rolling planetary transmission 26 while ignoring slippage. The rotational speed of spindle 27 is detected for example by magnet-sensitive rotational angle sensor 45, which detects incrementally the polarity changes of a magnet or magnets 46 situated on pressure disk 37. In order to obtain a reproducible measurement signal, independent of the component tolerances of hydrostatic sensor 1, the position of the magnet or magnets 46 is calibrated. Since housing part 14 with electronic control device 43 is designed as a separate sub-assembly, and is not joined to the sub-assembly of housing part 17 with electric motor 23 and rolling planetary transmission 26 until the end, circuit board 44 is incorporated into housing part 14 as a calibrated part, and the magnet or magnets 46 are received in a receiving pot 47, made of non-magnetic material such as stainless steel. After the installation of the sub-assembly with electric motor 23, receiving pot 47, axially calibrated against housing part 17, is received in the pressure disk, for example by a force fit. For example, receiving pot 47 may be calibrated axially against a contact surface 48 of housing part 17, the surface of which serves as a contact surface for housing part 14.

Figure 4:
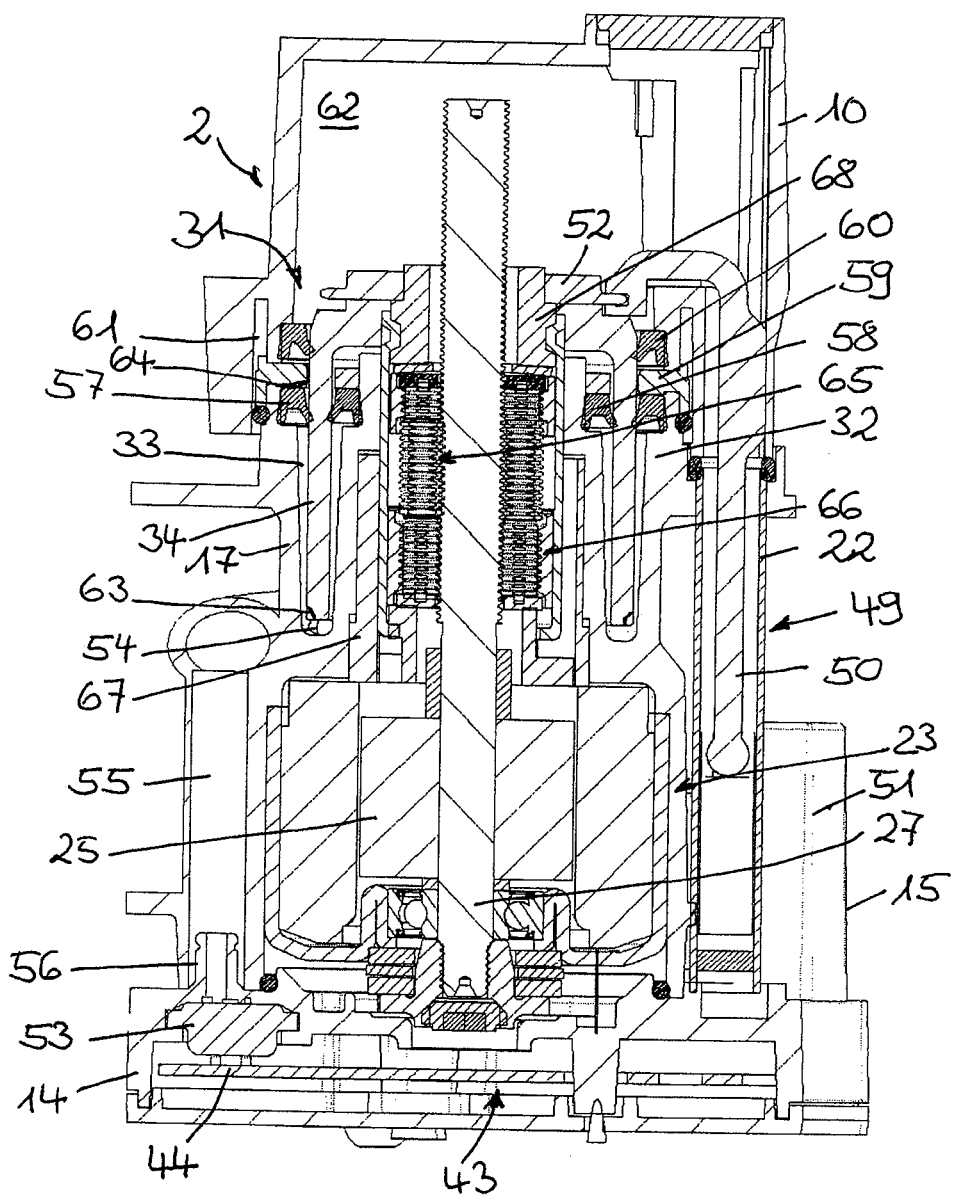
FIG. 4 shows a cross section through the hydrostatic actuator of FIG. 1 along the cutting line B-B.

FIG. 4 shows the hydrostatic actuator 1 of FIG. 1 along cutting line B-B. From this it is possible to see the arrangement of a distance sensor device 49 for monitoring master cylinder 31 with regard to the axial movement of piston 34, which is made up of a sensor body 50 which is axially movable in sensor channel 22 and a sensor element 51, accommodated in sensor housing 15. Sensor body 50 is hooked at one of its ends into a driver ring 52, which is firmly connected axially to piston 34, so that at its other end it produces a distance signal at the sensor element depending on the axial movement of piston 34.

To further monitor the functioning of master cylinder 31, a pressure sensor 53 is provided, which is in direct contact with and plugged into circuit board 44 and is supported axially against pressure in housing 2. This pressure sensor detects the pressure of pressure chamber 33 and thus the operating pressure of hydrostatic actuator 1, and of the slave cylinder connected thereto via the pressure connection 7 (FIG. 1). To this end, the opening 54 for the pressure connection 7 (FIG. 1) is expanded axially into a pressure duct 55 in a undisclosed manner, from which the pressure medium is conducted through a connector 56 situated on housing part 14 onto the pressure-sensitive surface of pressure sensor 53.

Piston 34, which plunges with its ring-shaped extension into the ring-shaped pressure chamber 33, is sealed radially on the inside and radially on the outside against housing part 17 by grooved ring seals 57, 58, which are positioned between housing parts 10, 17 by a pressure ring 59. Another grooved ring seal 60, which is spaced at a distance axially from grooved ring seals 57, 58, seals housing part 10 with respect to piston 34, so that a reserve chamber 61 is formed between an external space 62 and the pressure chamber 33. The follow-up chamber 61 is filled with pressure medium essentially under no pressure, which can be exchanged with the reserve container at a distance from the hydrostatic actuator 1 and preferably situated at a higher level hydrostatically, through a refill opening and a reserve line, not shown. To exchange, i.e. refill pressure medium, or to reduce surplus pressure remaining when piston 34 is retracted, piston 34 has sniffing grooves 63, which traverse the grooved ring seal 57 when piston 34 is retracted into a non-pressurized state of pressure chamber 33, so that pressure chamber 33 is connected with reserve chamber 61. To this end, a corresponding opening is also provided in the compression ring, for example an annular gap 64. According to another advantageous embodiment, at least one wall of the master cylinder housing 32 can be made of an insert for example of plastic or steel, so that leaks in the pressure chamber 33 resulting from cavitation of the master cylinder housing 32 made of die cast light metal can be avoided. Preferably, an insert that forms both walls and the front of the pressure chamber in a single piece is provided to this end.

The function of hydrostatic actuator 1 is explained by means of FIGS. 3 and 4, which show hydrostatic actuator 1 in the maximum pressurized position, i.e., with maximum pressure in pressure chamber 33, at which, for example, a compressed clutch actuated by the downline slave cylinder is completely engaged. In the unpressurized state, piston 34 is in the retracted state, in which the sniffing grooves 63 connect pressure chamber 33 with reserve chamber 61. If, starting from this state, electric motor 23 is supplied with current by the power transistors of electronic control device 43, rotor 25 turns spindle 27, on which rolling planetary bodies 30 roll with faced-toothed rolling surfaces 65 and are driven. The rolling planetary bodies 30 for their part, with their helically toothed rolling surfaces 66, which do not roll on the spindle 27, drive the ring gear sections 28, which are guided non-rotatably in a linear guide 67, so that the ring gear sections 28 together with sliding sleeve 40 are moved axially in the direction of electric motor 23 and carry the piston 34 with them by a driver disk 68, so that the piston plunges into pressure chamber 33, forming increasing pressure. The pressure forces in pressure chamber 33 and the application forces of electric motor 23 are aligned with each other in this case, so that the equilibrium of forces is limited to housing part 17, and the other housing parts 10, 14 can be designed for lighter loads.

REFERENCE LABELS 1 hydrostatic actuator
2 housing
3 attaching device
4 attaching flange
5 screw
6 arrow
7 pressure connection
8 connector plug
9 arrow
10 housing part
11 cover
12 access opening
13 connector plug
14 housing part
15 sensor housing
16 electronic component
17 housing part
18 flange
19 flange
20 cover
21 heat dissipation device
22 sensor channel
23 electric motor
24 stator
25 rotor
26 rolling planetary transmission
27 spindle
28 ring gear section
29 web part
30 rolling planetary body
31 master cylinder
32 master cylinder housing
33 pressure chamber
34 piston
35 end shield
35a shielding
36 extension
37 compression disk
38 support 38a radial bearing
38b thrust bearing
39 rim
40 sliding sleeve
41 opening
42 torque support
42a pin
43 electronic control device
44 circuit board
45 rotational angle sensor
46 magnet
47 receiving pot
48 contact surface
49 distance sensor device
50 sensing body
51 sensor element
52 driver ring
53 pressure sensor
54 opening
55 pressure duct
56 connector
57 grooved ring seal
58 grooved ring seal
59 compression ring
60 grooved ring seal
61 reserve chamber
62 external space
63 sniffing groove
64 annular gap
65 rolling surface
66 rolling surface
67 linear guide
68 driver disk
100 receiving component
102 motor vehicle
104 slave cylinder
106 pressure line
A-A cutting line
B-B cutting line

What is claimed is:

1. A hydrostatic actuator for a motor vehicle comprising:
a housing;
an electric motor located within the housing, the electric motor including a rotor situated within a stator;
a piston axially movable in the housing, the piston acting on a pressure chamber filled with a pressurizing agent;
a rolling planetary transmission within the housing and including rolling planetary bodies and ring gear sections that interact with a spindle having a first axial end and a second axial end, the rolling planetary transmission converting a rotary propulsion of the electric motor to an axial motion of the piston such that the piston moves axially with respect to the spindle; and
a single radial bearing supporting the spindle near the first axial end, the rolling planetary bodies and ring gear sections supported by the spindle between the first axial end and the second axial end such that the spindle extends entirely through the rolling planetary bodies, the ring gear sections and the piston, the spindle connected with the rotor towards the first axial end and the second axial end being a free end which extends away from the pressure chamber.

2. The hydrostatic actuator as recited in claim 1 further comprising:
an integrated electronic control device for controlling the electric motor;
an attaching device adjacent to the electronic control device for attaching the hydrostatic actuator to a receiving component of the motor vehicle; and
a heat dissipation device situated between the electronic control device and the attaching device.

3. The hydrostatic actuator as recited in claim 1 further comprising:
an integrated electronic control device for controlling the electric motor; and
a rotational angle sensor in the integrated electronic control device; and
at least one magnet for the spindle, an axial position of the at least one magnet being calibratable relative to the spindle.

4. The hydrostatic actuator as recited in claim 1 wherein a pressure equalization of the pressure chamber is provided, the pressure equalization being divided into a reserve chamber in the housing and a storage container connected thereto and situated outside of the housing.

5. The hydrostatic actuator as recited in claim 1 wherein the radial bearing is situated on an end shield which surrounds the stator in a form of a cup.

6. The hydrostatic actuator as recited in claim 5 wherein a radial heat expansion coefficient of the end shield is matched to a radial heat expansion coefficient of the electric motor.

7. The hydrostatic actuator as recited in claim 5 wherein the end shield forms a shielding for an electronic control device for controlling the electric motor.

8. The hydrostatic actuator as recited in claim 5 wherein the stator is rotationally fixed with respect to the end shield, the end shield having a torque support with respect to a housing part connected to the housing.

9. The hydrostatic actuator as recited in claim 1 further comprising an attaching device for joining the hydrostatic actuator to a receiving component, the attaching device being aligned in the same direction as a pressure connection of the pressure chamber.

10. A motor vehicle comprising the hydrostatic actuator as recited in claim 1.

11. The hydrostatic actuator as recited in claim 3 wherein the integrated electronic control device, the rotational angle sensor and the at least one magnet are provided at the first axial end of the spindle.

12. The hydrostatic actuator as recited in claim 1 further comprising a sensor channel extending parallel to the spindle, the sensor channel being provided with a sensor body extending axially in the sensor channel, the sensor body being fixed to the piston such that the sensor body moves axially in the sensor channel upon axial movement of the piston.

13. The hydrostatic actuator as recited in claim 1 wherein the pressure chamber forms a ring around the ring gear sections and rolling planetary bodies.

14. The hydrostatic actuator as recited in claim 1 further comprising a sliding sleeve fixed to the piston, the ring gear sections being centered within the sliding sleeve.

15. The hydrostatic actuator as recited in claim 14 further comprising a driver disk surrounding the spindle and fixing the sliding sleeve to the piston, the piston extending away from the driver disk toward the electric motor.

16. The hydrostatic actuator as recited in claim 15 wherein the rolling planetary bodies include helically toothed rolling surfaces configured for driving the ring gear sections, which are guided non-rotatably in a linear guide, so that the ring gear sections together with the sliding sleeve are moved axially in a direction of the electric motor and carry the piston by the driver disk, so that the piston plunges toward the electric motor into the pressure chamber, thereby increasing pressure.

17. The hydrostatic actuator as recited in claim 5 wherein an axial force of the rolling planetary transmission while under pressure from the piston is introduced into a rim of the end shield through a pressure disk, situated on the spindle, by a thrust bearing.

18. The hydrostatic actuator as recited in claim 5 wherein the end shield has a floor including a multiple-folded axial extension receiving a support of the spindle with the radial bearing.

19. The hydrostatic actuator as recited in claim 3 wherein the rotational angle sensor is configured for simultaneously detecting a rotational angle of the rotor so that the rotor is configured for serving on the one hand for electronic commutation of the electric motor, and on the other hand for redundant detection of travel of the piston, by taking into account a gear ratio change of the rolling planetary transmission while ignoring slippage.

* * * * *